May 20, 1930. H. PERLESZ 1,759,415
TOTALLY INCLOSED AND VENTILATED ELECTRIC MACHINE
Filed Jan. 18, 1928 4 Sheets-Sheet 1
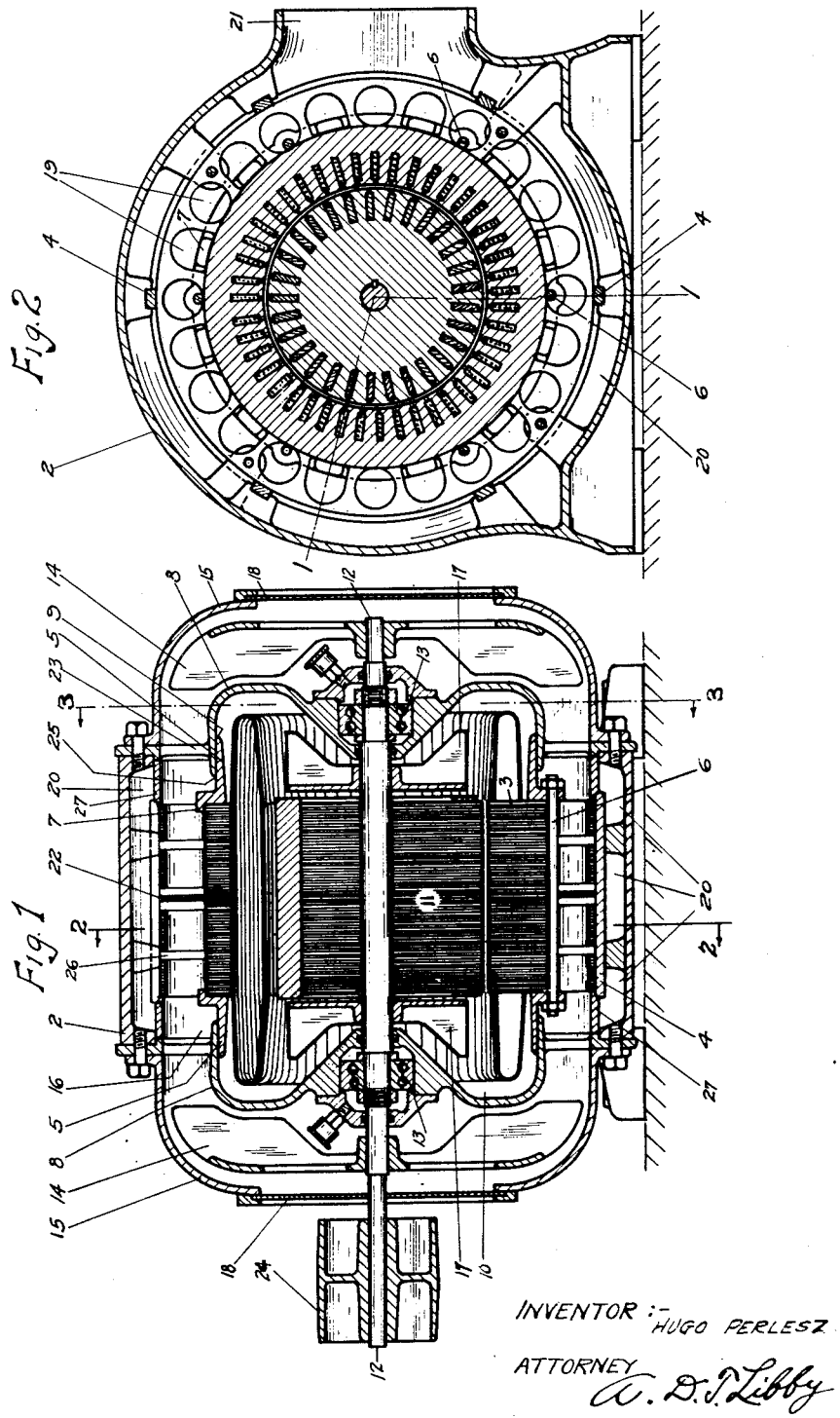
INVENTOR:-
HUGO PERLESZ
ATTORNEY
A. D. J. Libby

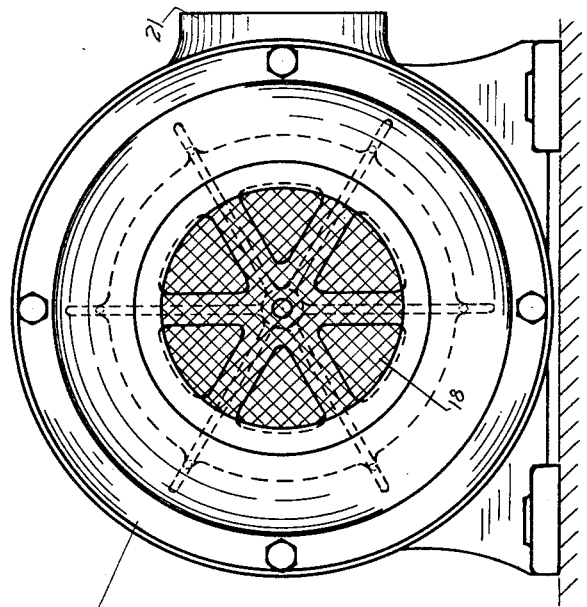
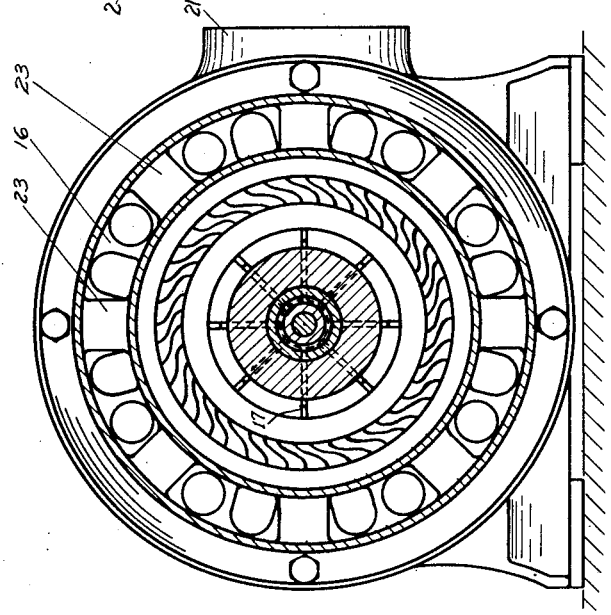

May 20, 1930. H. PERLESZ 1,759,415
TOTALLY INCLOSED AND VENTILATED ELECTRIC MACHINE
Filed Jan. 18, 1928 4 Sheets-Sheet 3
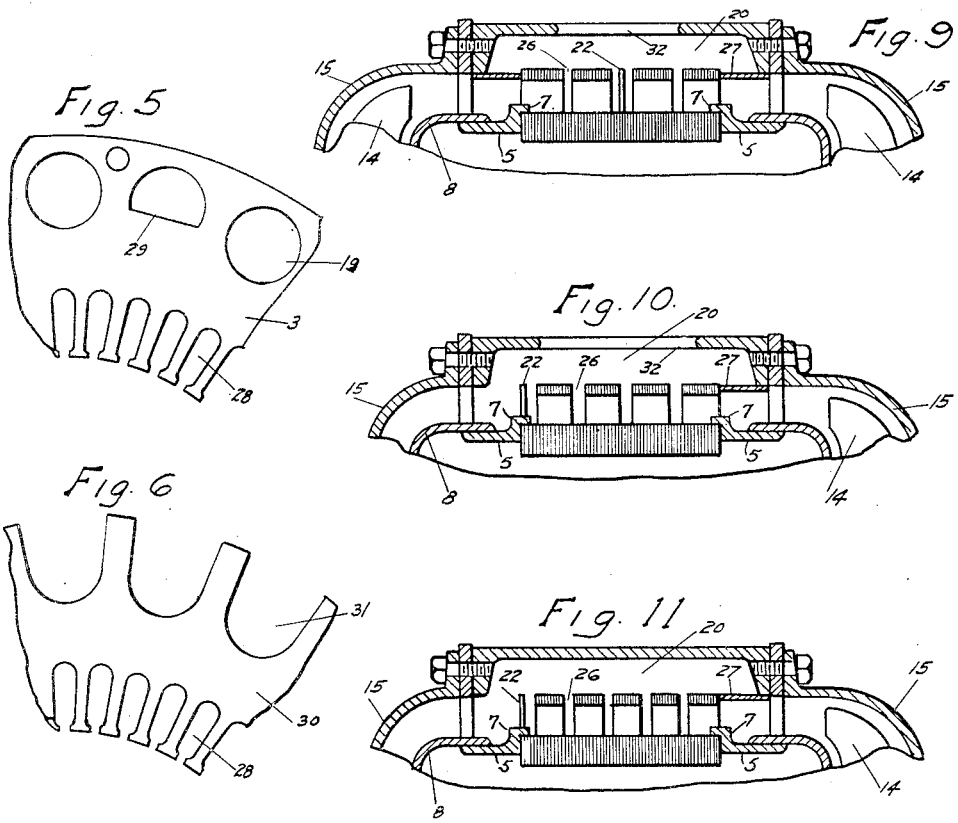
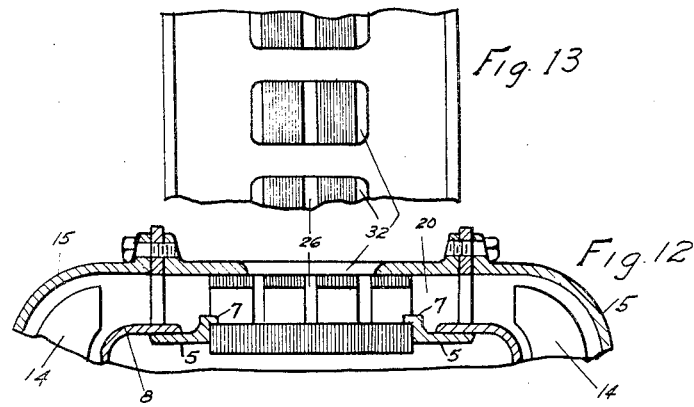
INVENTOR
HUGO PERLESZ
BY
A. D. T. Libby
ATTORNEY May 20, 1930. H. PERLESZ 1,759,415
TOTALLY INCLOSED AND VENTILATED ELECTRIC MACHINE
Filed Jan. 18, 1928 4 Sheets-Sheet 4
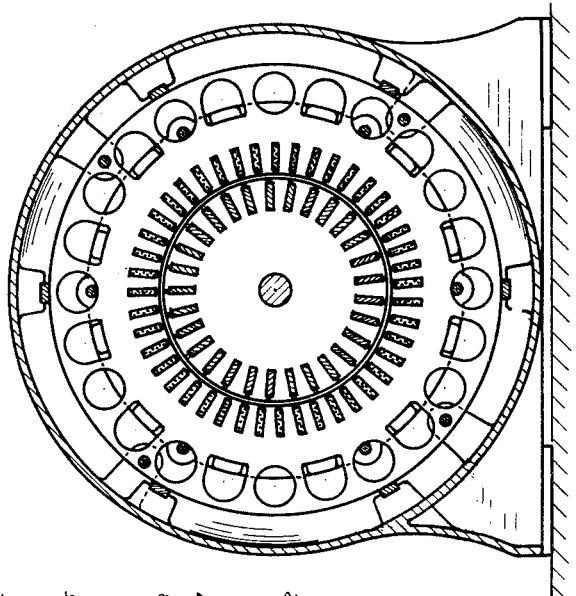
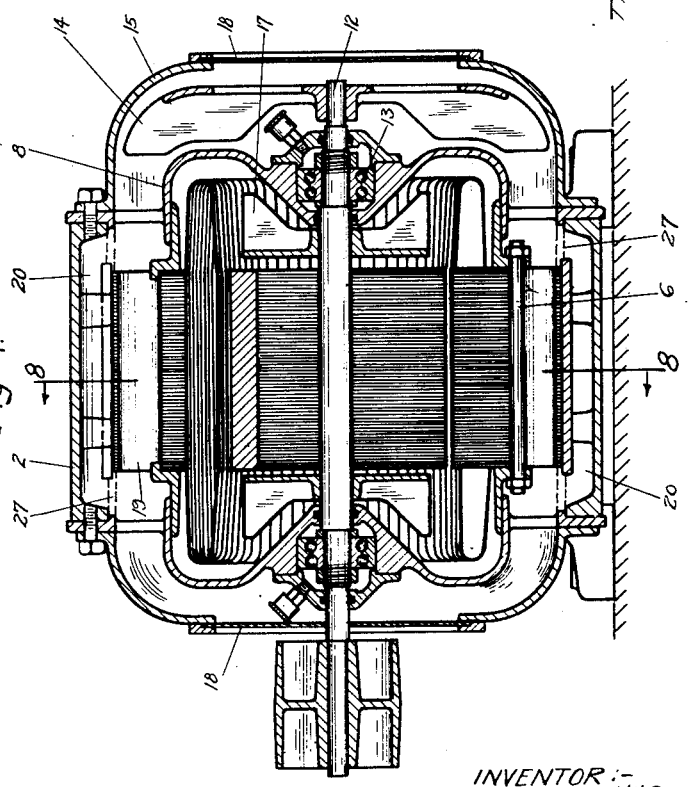
INVENTOR:- HUGO PERLESZ
ATTORNEY
A. D. T. Lebby Patented May 20, 1930

1,759,415

UNITED STATES PATENT OFFICE

HUGO PERLESZ, OF CEDARBURG, WISCONSIN, ASSIGNOR TO AMERICAN ELECTRIC MOTOR COMPANY, OF MILWAUKEE, WISCONSIN

TOTALLY INCLOSED AND VENTILATED ELECTRIC MACHINE

Application filed January 18, 1928. Serial No. 247,498.

This invention relates in general to improvements in the construction of totally inclosed electric motors and generators and particularly to the cooling or ventilating thereof. For the purpose of explanation, the invention will be described as embodied in an induction motor of the alternating current type, although it may be applied with like advantage to other similar machines.

The open type of motor usually employed in the industrial field, does not exclude from the vital parts of the motor, the dust, fumes, soot, or any dirt laden atmosphere usually found in factories or where motors are used, hence, it becomes necessary to clean and inspect such motors periodically to remove any accumulated dirt etc., from its vital parts to prevent its overheating and consequent failure.

To obviate these things means for protecting and ventilating the interior parts of dynamo electric machines are shown, described and claimed in Daun et al. Patent 1,645,496, issued October 11, 1927, but I have discovered ways and means for totally inclosing the windings of the machine, whereby the cooling air currents do not come into direct contact with them but the cooling is obtained by other novel means.

A totally inclosed motor prevents any dirt or fumes entering into its interior, due to its being entirely inclosed, but for this very reason of being so enclosed, its mechanical structure must be designed to prevent its overheating. This usually means that the whole motor becomes larger and heavier for a given capacity and therefore more expensive to manufacture and more costly for the purchaser.

An object of this invention is to reduce the size and weight of totally inclosed motors without impairing their capacity and adaptability to commercial use.

Another object of this invention is to make possible the radiation of heat direct from its source to the outside atmosphere by the shortest and best possible means and without exposing the vital parts of the motor.

The heat created in alternating current motors or generators is caused directly by the eddy currents and hysteresis in the iron and the flow of electric current through its windings or coils, the coils being in close contact with the stator or stationary core. This heat is absorbed mainly by the stator and must be dissipated by some means or it will increase to a point where the heat will char or burn the insulation, causing a short circuit. An object of this invention is to so construct the stator core so that substantially all the heat created at its source, will radiate from its surfaces while exposed to a continuous draft of air; also to so construct the stator core so that the cooling air will come in contact with the maximum heat dissipating surfaces thereof. Another object of my invention is to effect the removal of heat at the source of its generation or within the magnetic field of the stator, rather than from heat radiating projections on the stator thereby enhancing said heat removal or dissipation.

A clear conception of the several novel features of this invention may be had from the accompanying drawings and forming a part of the following specification in which like reference characters designate the same or similar parts in the various views:

Figure 1, is a longitudinal section through the motor along the line 1—1 of Figure 2, showing the machine in full diameter.

Figure 2 is a transverse section along the line 2—2 of Fig. 1.

Figure 3 is a transverse section along the line 3—3 of Fig. 1.

Figure 4 is a view of the right hand end of Figure 1 showing the blower or fan in dotted lines.

Figure 5 is a view of a part of a stator laminæ.

Figure 6 is a view of a sector of a special stator laminæ.

Figure 7 is a view similar to Fig. 1, but of a modified form of construction.

Figure 8 is a section on the line 8—8 of Fig. 7.

Figure 9 is a fragmentary view of a portion of the machine similar to that shown in Figure 1, but with one or more air outlets distributed around the periphery of the frame.

Figure 10 is a view similar to Figure 9, but with certain of the details differently arranged.

Figure 11 is a view similar to Figure 10, without openings in the periphery of the frame.

Figure 12 is a view somewhat like Figure 9, without the air chamber between the periphery of the stator and the frame.

Figure 13 is a fragmentary plan view of the periphery of the frame shown in Figure 12.

The electric motor to which this invention has been applied herein by way of illustration, comprises in general, an annular main inclosing and supporting frame 2, in which is disposed a laminated core or stator 3, by means of the removable keys 4, (see Patent 1,626,028). The stator 3 is clamped together by means of clamping rings 5 and bolts 6. The clamping rings 5, are held concentric preferably by projections entering the perforated stator laminations at 7. The laminations preferably having certain of the perforations provided with a flat side 29, (see Figure 5) to form a more secure seat for said projections, and slidably enter the bearing support plates 8 at 9, in order to be able to use different longitudinal lengths of stator cores 3, and to effectively prevent any dirt from entering the coil inclosure 10. In order to further insure a tight joint at the point 25 and to assist in case of assembly and disassembly and to provide for expansion and contraction with varying temperatures, a suitable packing ring or gasket may be used over the rings 5 adjacent the point 25. On the other hand the rings 5 or support plates 8 or both may be grooved and packing rings of a suitable type used therein to produce the required result. The rotating member or rotor 11 is secured to the shaft 12, by any suitable means, the shaft being supported by suitable bearings 13, in the support plates 8, and driven by any suitable means such as pulley 24. The blowers or fans 14 are also secured to the shaft 12, and are protected by shields or hoods 15. The hoods 15, are designed to direct the air blown from the fans 14, through the openings 16 between the arms 23 which in this case are integral with the supporting plates 8. The drawing also shows two additional fans 17, which may be omitted in some cases, mounted on the shaft 12; these are for the purpose of keeping the air in the inner chamber or coil inclosure 10, in rapid motion to enhance its cooling by coming into contact with supporting plates 8, and clamp rings 5, which are cooled by air being blown against them from fans 14, previously mentioned.

When the motor is in operation, the fans 14, will create a suction of air through the screened openings 18, in hoods 15; the air will then be blown through openings 16 in supporting plates 8, thence, through the perforations 19, of the stator core 3, thence into the annular chamber 20 via the spaces 26 between groups of laminations, and into the atmosphere through the opening 21, in frame 2, thereby cooling the outer surface of the inner chamber 10, and the laminations of the stator core 3. The spaces 26 are preferably obtained by using laminæ of small diameter between groups of larger diameter having the ventilating perforations. These spaces 26 may be obtained by using a number of special laminations 30, (see Figure 6) which have open slots 31 in place of the perforations 19 used in the other laminations, and certain of the claims are intended to cover both arrangements. Near the central vertical plane of the stator a partition 22, is or may be provided by using a plurality of laminæ or their equivalent, of substantially the same diameter as those having the perforations 19, but without these perforations. This partition prevents interference of the air currents, coming from the ends of the motor toward the center, and directs the air radially outward into chamber 20.

It is also to be noted with respect to Fig. 1, that a ring 27 is used at the end of the stator to close off the chamber 20 from direct communication with the openings 16, thus forcing the air to pass through the perforations 19 in the stator and then into the chamber 20 as described. The rings 27 may be made integral with the support plates 8 or the frame 2, but in either case, gaskets may be used although a small leak past the rings or flanges 27 is permissible.

It is contemplated that for certain classes of work where the conditions of operation are not so severe that one fan and the partition 22 may be removed as indicated in Figs. 7 and 8, and the air is discharged through the stator core perforations 19, to the opposite side of the motor and to the atmosphere. In this case all the laminations are perforated substantially alike and none used of smaller diameter as previously described. In such cases the rings 27 as shown by dotted lines, Fig. 7, may be omitted and the frame 2 may be brought inward to meet the stator core at its periphery thereby omitting the air chamber 20 entirely. In Fig. 7 the rings or flanges 27 are shown by dotted lines as they may or may not be used, or they may have openings therein whereby only a small part of the air from the fan is diverted to the outside chamber 20.

Since it is essential to keep the stator cool this can best be done by driving the greater part of the air through the perforations 19, thereby picking up the heat nearer to its source. By extending the material of the stator laminations beyond the winding slots 28, more than the usual distance actually needed for proper magnetic loading, as shown in Fig. 5, I attain a double advantage or improvement in that a greater amount of magnetic material is provided for the flux whereby the density per unit area is reduced at this locality and the cooling air currents which pass through are brought nearer to the source of heat generation, thereby facilitating its removal as the flux travels in the material on all sides of the hole. When the rings or flanges 27 are used in the form shown in Figure 7, without openings therein whereby the chamber 20 is completely shut off from the interior of the motor then the outer wall of the chamber or frame of the machine may have openings therein so the heated air in the chamber 20 can escape, as shown in Figures 9 and 10 wherein these openings are indicated at 32; when openings 32 are used in the periphery of the frame it is not necessary to use the style of construction shown in Figures 3 and 4. In Figure 10, the partition 22 is moved to the end of the stator and only one closure ring 27 is used. Likewise one fan 14 operated by the rotor shaft is used adjacent this place of closure so that the air coming through the shields 15 is forced through the air ducts formed by the perforations 19, and since the partition or baffle plate 22 is placed at the opposite end of the stator, air is forced through the spaces 26 to the chamber 20, and thence through the openings 32 to the exterior of the machine. In Figure 11 there are no openings 32 in the frame, and the air is forced out of the opposite end of the machine between the bearing support plate 8 and the shield 15. In Figure 12, the air chamber 20 is dispensed with and the frame is brought inward to meet the stator core at its periphery, and a fan located at each end of the machine is preferably used to force the air through the air ducts in the stator, and through the spaces 26 to the exterior.

It is to be understood that the same partition 22 may be utilized in the construction shown in Figure 12, as well as the spaces 26. One of the fans 14 may be omitted so that the cooling air is blown from one end of the machine to the other.

It should be understood that it is not desired to limit this invention to the exact details of construction herein shown and described for the various modifications illustrated show that the invention is susceptible of many changes in these details, but it is intended that they shall all come within the scope of the appended claims.

Having thus described my invention, what I claim is:

1. In a dynamo electric machine, a frame, a stator carried within said frame, but spaced apart therefrom to form an air chamber, said frame having at least one outlet from said chamber to the atmosphere, said stator being composed of a plurality of groups of laminæ, said groups being differently constructed, the laminæ of one group having perforations near their outer periphery to form air ducts therethrough, the laminæ of another group being so constructed beyond the winding slots as to form radial air vents leading from said air ducts to said air chamber, journal support plates at each end of the machine, each of said plates having a portion projecting toward the stator, each of said plates having a flange extending radially to provide means for attachment to said frame, said flange having openings substantially in line with said perforations in the stator laminations, a ring carried at each end of the stator core and having a part co-operating with said projecting portion of each of said plates to form a closure for the stator winding, means positioned at the ends of and adjacent the outer edges of the stator for closing off said air chamber at these respective points, a rotor and shaft journalled in said support plates, a fan carried on the rotor shaft at least at one end adjacent to and outside said plate and a shield having air admission means for covering said fan and co-operating with an adjacent support plate to form a fan chamber.

2. In a dynamo electric machine, a frame, a stator carried within said frame but spaced apart therefrom to form an air chamber, said frame having at least one outlet from said chamber to the atmosphere, said stator being composed of a plurality of groups of laminæ, said groups being differently constructed, the laminæ of one group having perforations near their outer periphery to form air ducts therethrough, the laminæ of another group being so constructed beyond the winding slots as to form radial air vents leading from said air ducts to said air chamber, a partition carried by the stator and disposed so as to intercept said air ducts for the purpose described, journal support plates at each end of the machine, each of said plates having a portion projecting toward the stator, each of said plates having a flange extending radially to provide means for attachment to said frame, said flange having openings substantially in line with said perforations in the stator laminations, a ring carried at each end of the stator core and having a part co-operating with said projecting portion of each of said plates to form a closure for the stator winding, means positioned at the ends of and adjacent the outer edges of the stator for closing off said air chamber at these respective points, a rotor and shaft journalled in said support plates, a fan carried on the rotor shaft at least at one end adjacent to and outside said plate and a shield having air admission means for covering said fan and co-operating with an adjacent support plate to form a fan chamber.

3. In a dynamo electric machine, a frame, a stator carried within said frame, but spaced apart therefrom to form an air chamber, said frame having at least one outlet from said chamber to the atmosphere, said stator being composed of a plurality of groups of laminæ, said groups being constructed of laminæ of different diameter, those of larger diameter being arranged together, the laminæ of which have perforations near their outer periphery arranged to form air ducts through the stator, while the groups of smaller diameter are disposed between said groups of larger diameter so as to form radial air vents leading to said air chamber, a partition composed of imperforate laminæ of the large diameter disposed so as to intercept said air ducts for the purpose described, journal support plates at each end of the machine, each of said plates having a portion to cooperate with parts carried by the stator to form a closure for the rotor and the stator windings, a ring carried at each end of the stator core and having a part to cooperate with said plate portion for the purpose described, means positioned at the ends of and adjacent the outer edges of the stator for closing off said air chamber at these respective points, a rotor journalled between said plates, a fan operated by the rotor shaft, at least at one end adjacent to and outside said plate and a shield to cover said fan and formed to direct the incoming air into the stator air ducts.

4. In a dynamo electric machine, a frame, a stator carried within said frame but spaced apart therefrom to form an air chamber, said stator being composed of a plurality of groups of laminæ, said groups being differently constructed, the laminæ of one group having perforations near their outer periphery to form air ducts therethrough, the laminæ of another group being so constructed beyond the winding slots as to form radial air vents leading from said air ducts to said air chamber, journal support plates at each end of the machine, each of said plates having a portion projecting toward the stator, each of said plates having a flange extending radially to provide means for attachment to said frame, said flange having openings substantially in line with said perforations in the stator laminations, a ring carried at each end of the stator core and having a part cooperating with said projecting portion of each of said plates to form a closure for the stator winding, means positioned at least at one end of and adjacent the outer edge of the stator for closing off said air chamber at this place, a partition carried by the stator for the purpose described, a rotor and shaft journalled in said support plates, a fan located adjacent said closed off place and operated by the rotor shaft and a shield having air inlet means covering said fan and acting to direct air coming through said inlet means into said air ducts in the stator.

In testimony whereof, I affix my signature.

HUGO PERLESZ.